(12) United States Patent  (10) Patent No.: US 8,314,894 B2
Onodera et al. (45) Date of Patent: Nov. 20, 2012

(54) PROJECTION TYPE TABLE DISPLAY

(75) Inventors: Shinji Onodera, Yokohama (JP); Tatsuya Ishikawa, Yokohama (JP); Yusuke Mukai, Kawasaki (JP); Satomi Morishita, Yokohama (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 413 days.

(21) Appl. No.: 12/645,824

(22) Filed: Dec. 23, 2009

(65) Prior Publication Data

US 2010/0245685 A1   Sep. 30, 2010

(30) Foreign Application Priority Data

Mar. 31, 2009   (JP) ................................ 2009-083961

(51) Int. Cl.
 *H04N 3/22* (2006.01)
(52) U.S. Cl. ...................................................... 348/745
(58) Field of Classification Search .................. 348/744, 348/745, 746, 747, 751; 353/69, 70
 See application file for complete search history.

(56) References Cited

U.S. PATENT DOCUMENTS

| | | | |
|---|---|---|---|
| 5,497,433 A * | 3/1996 | Itoh et al. | 382/211 |
| 6,232,937 B1 * | 5/2001 | Jacobsen et al. | 345/87 |
| 6,677,936 B2 * | 1/2004 | Jacobsen et al. | 345/211 |
| 7,384,158 B2 * | 6/2008 | Ramachandran et al. | 353/70 |
| 7,714,943 B2 * | 5/2010 | Bassi et al. | 348/744 |
| 7,824,039 B2 * | 11/2010 | Takito et al. | 353/69 |
| 2008/0204673 A1 | 8/2008 | Hirata et al. | |

FOREIGN PATENT DOCUMENTS

JP   2008-209670   9/2008

* cited by examiner

*Primary Examiner* — Paulos Natnael
(74) *Attorney, Agent, or Firm* — Antonelli, Terry, Stout & Kraus, LLP.

(57) ABSTRACT

In the usage of table projection of a projection type display, depending upon a sitting position of a participant of a conference, the participant views an image projected upon a table as an inversion image turned upside down, resulting in poor visual recognition. In order to improve visual recognition, images are rotated, synthesized and displayed in accordance with the viewing direction of each participant. More specifically, the projection type display is provided with a two-image synthesizing unit for synthesizing two images obtained by processing an input image by two image rotation units for rotating the input image by a first angle and a second angle different from the first angle, into one image on a screen. The projection type display is also provided with an image rotation unit and an image inversion unit for two-image display on a screen.

11 Claims, 5 Drawing Sheets

PROJECTION TYPE TABLE DISPLAY

INCORPORATION BY REFERENCE

The present application claims priority from Japanese Patent Application JP2009-083961, filed on Mar. 31, 2009, the content of which is hereby incorporated by reference into this application.

BACKGROUND OF THE INVENTION

The present invention relates to techniques of providing a projection type display for projecting images.

In recent years, a projection type display including a projector provides a variety of usage types. In one usage type, an image is projected upon a generally vertical flat plane such as a general screen, a room wall and a blackboard. In addition to this usage type of projecting an image upon a generally vertical flat plane, in another usage type, a projection type display can project an image upon a generally horizontal flat plane such as a desk, as described in JP-A-2008-209670.

SUMMARY OF THE INVENTION

When a person viewing (viewer) views an image projected by a projection type display (projected image) on a generally vertical flat plane including a general screen, there arises no problem because an up-down direction of the projected image coincides with an up-down direction of the viewer.

Figure 3:
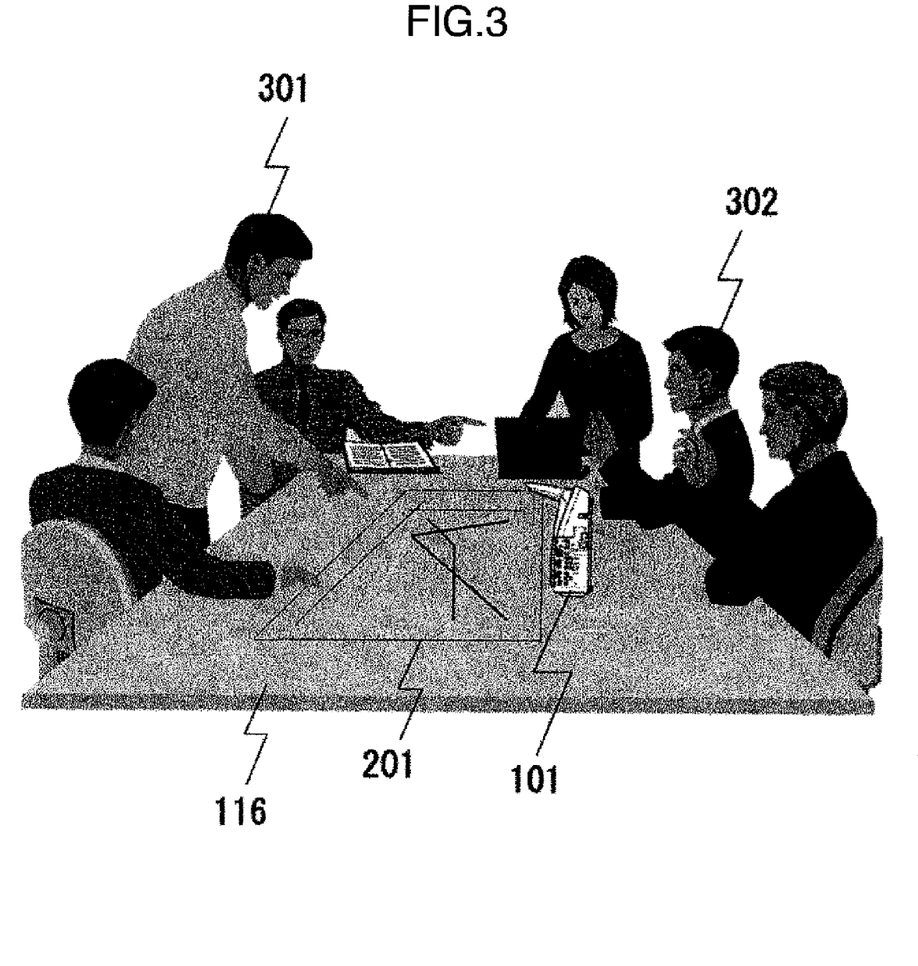
FIG. 3 is a diagram illustrating a usage type of projecting an image on a table.

However, the projection type display described in the above-described JP-A-2008-209670 can project an image on a generally horizontal flat plane such as a table. A problem associated with this display will be described with reference to FIG. 3. FIG. 3 is a diagram illustrating a usage type (such as conference) of projecting an image on a table.

In FIG. 3, reference numeral 116 represents a projection plane (table surface), reference numeral 101 represents a projection type display, reference numeral 201 represents a projected image on the table, and reference numerals 301 and 302 represent viewers. In the usage of table projection, viewers surround in many cases the projected image as illustrated in FIG. 3. In such cases, a direction along which the projected image 201 is viewed changes with the position of each viewer. For example, assuming that the up direction of the projected image 201 is right in the drawing, the viewer 301 views the projected image 201 along the coincident up-down direction (a shift of 0 degree between the up-down direction as viewed by the viewer 301 and the up-down direction of the projected image 201), whereas the viewer 302 views the projected image 201 upside down (a shift of 180 degrees between the up-down direction as viewed by the viewer 302 and the up-down direction of the projected image 201), resulting in poor visual recognition.

This point is not considered at all for the projection type display described in the above-described JP-A-2008-209670.

An object of the present invention is to provide a projection type display capable of projecting an image providing good visual recognition to each of viewers even if the viewers surround the projected image on a table during a conference or the like.

According to the present invention, a projection type display is provided with an image processing unit including: a first image rotation unit for rotating the input image by a first angle; a second image rotation unit for rotating the input image by a second angle; and a two-image synthesizing unit for synthesizing a first output image from said first image rotation unit and a second output image from said second image rotation unit into one image.

According to the present invention, a projection type display can be realized which can project an image providing good visual recognition to each of viewers even if the viewers surround the projected image on a table during a conference or the like.

Other objects, features and advantages of the invention will become apparent from the following description of the embodiments of the invention taken in conjunction with the accompanying drawings.

DETAILED DESCRIPTION OF THE INVENTION

Best modes for carrying out the present invention will now be described with reference to the accompanying drawings. In each drawing to be described below, elements having common functions are represented by using identical reference numerals, and for the element described once, duplicate description is omitted.

First Embodiment

Figure 1:
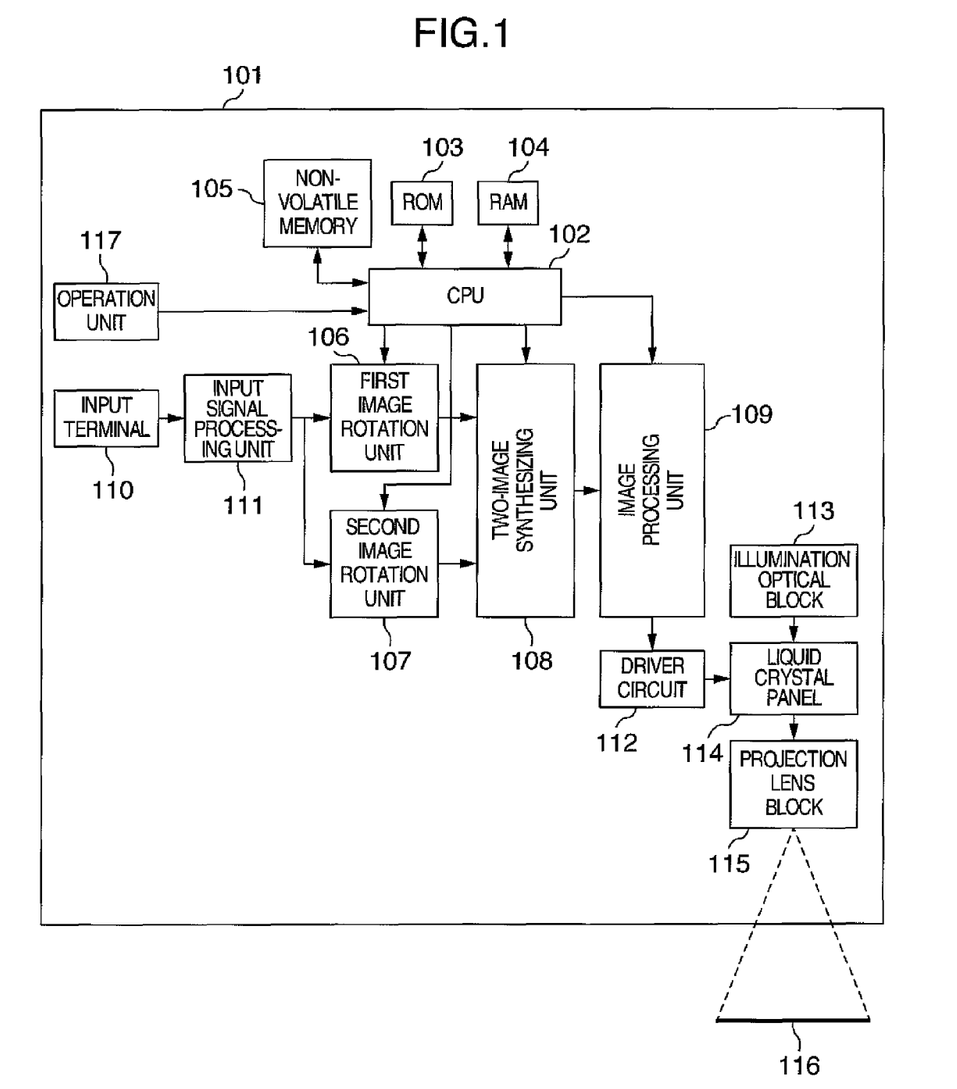
FIG. 1 is a block diagram of a projection type display according to a first embodiment of the present invention.

FIG. 1 is a block diagram of a projection type display of the first embodiment. In FIG. 1, reference numeral 101 represents the project type display, a central processing unit (abbreviated to "CPU" in the following) 102 performs an overall control of the projection type display, a ROM (including a flash ROM) 103 stores programs for controlling CPU 102, a RAM 104 stores calculation results and the like to be used by CUP 102 when programs are executed, a nonvolatile memory 105 stores a variety of information, an input terminal 110 receives a video signal (not shown) from an external, and an input signal processing unit 111 executes a predetermined process for a video signal input from the input terminal 111.

The input signal processing unit 111 analog-digital converts the input signal into digital data, and outputs the digital data to a first image rotation unit 106 and a second image rotation unit 107. The first image rotation unit 106 rotates an input image by a first angle (an image rotated by the first image rotation unit is called herein a first rotation display image). The second image rotation unit 107 rotates an input image by a second angle different from the first angle (an image rotated by the second image rotation unit is called herein a second rotation display image).

A two-image synthesizing unit 108 synthesizes the first and second rotation display images rotated and output from the first and second image rotation units 106 and 107 into one image. An image processing unit 109 performs scaling including image magnification, image reduction, geometrical distortion correction and the like of an image signal output from a two-image synthesizing unit 108.

In this embodiment, although the image magnification and reduction are performed by the image processing unit 109 after two-image synthesis, the image magnification and reduction may be performed in advance by the first and second image rotation units 106 and 107, or the image magnification and reduction may be performed by the two-image synthesizing unit 108 relative to the first and second rotation images after image rotation output from the first and second image rotation units 106 and 107. Alternatively, the image magnification and reduction may be preformed by an arbitrary combination of the first and second image rotation units 106 and 107, two-image synthesizing unit 108 and image processing unit 109.

Reference numeral 112 represents a driver circuit, reference numeral 113 represents an illumination optical block, reference numeral 114 represents a liquid crystal panel, reference numeral 115 represents a projection lens block, and reference numeral 116 represents a projection plane. The illumination optical block 113 converts randomly polarized light from a light source (not shown) into linearly polarized light with a polarization conversion device (not shown), and applies the linearly polarized light to the liquid crystal panel 114. The liquid crystal panel 114 controls a transmission amount of light applied from the illumination optical block 113. In accordance with image data output from the image processing unit 109, the driver circuit 112 controls a transmissivity of each pixel of the liquid crystal panel 114 to thereby form an image. In this example, the liquid crystal panel 114 is constituted of a laterally elongated LCD panel of high resolution. The projection lens block 115 magnifies and projects light (image) transmitted through the liquid crystal panel 114 so that an image formed on the liquid crystal panel 114 is projected upon the projection plane 116. An operation unit 117 controls the projection type display 101 by a plurality of operation buttons disposed on the housing of the projection type display and by an infrared remote control signal (hereinafter abbreviated to "IR remote signal") from a remote controller.

Figure 2A:
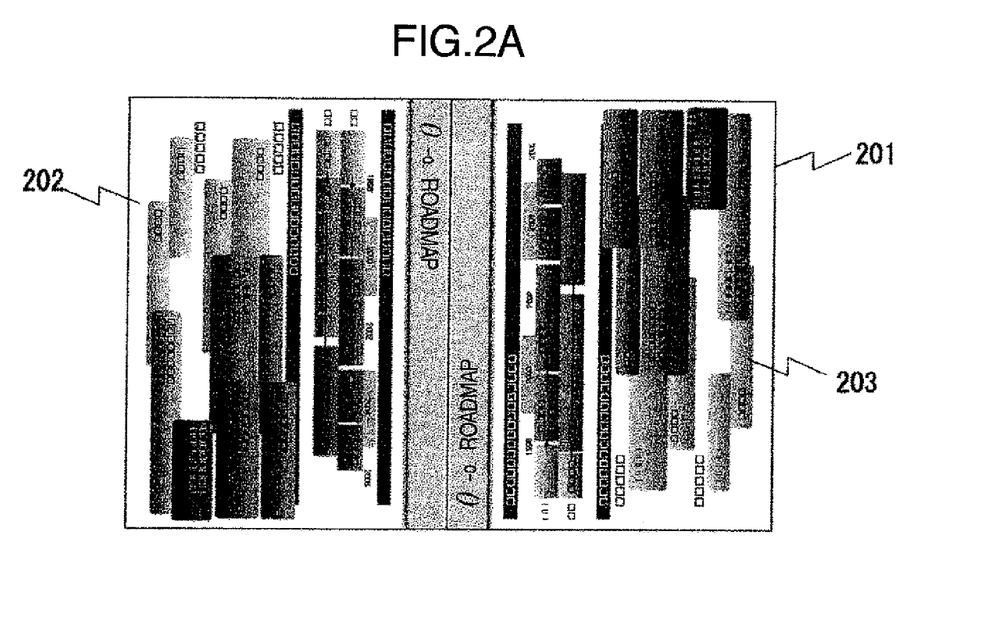
FIGS. 2A and 2B are diagrams illustrating projected images.
Figure 2B:
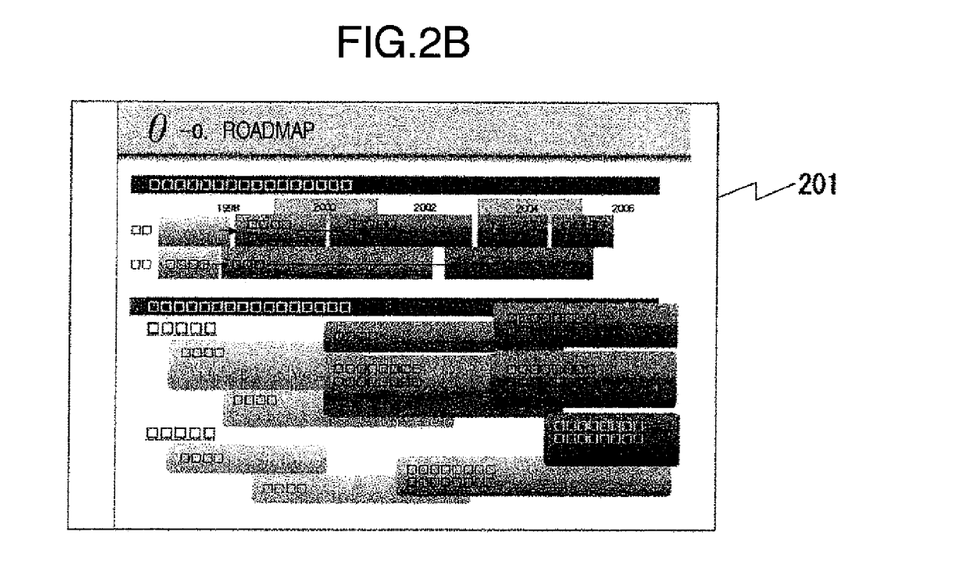

FIGS. 2A and 2B are diagrams illustrating projected images. Reference numeral 201 represents a displayed image, reference numeral 202 represents a first rotation display image, and reference numeral 203 represents a second rotation display image. FIG. 2A illustrates a display example of two-image rotation display projected on a generally horizontal flat plane such as a table, and FIG. 2B illustrates a display example of one-image on a screen projected on a generally vertical flat plane such as a general screen.

Description will be made first on two-image rotation display to be used for projection upon a generally horizontal flat plane such as a table.

A video signal input from the input terminal 110 is analog-digital converted by the input signal processing unit 111, and the converted digital data is input to the first image rotation unit 106 and second image rotation unit 107. The image input to the first image rotation unit 106 is rotated by a first angle (90 degrees in the clockwise direction) to form the first rotation display image 202.

The image input to the second image rotation unit 107 is rotated by a second angle (270 degrees in the clockwise direction) to form the second rotation display image 203. The video signals subjected to rotation are input to the two-image synthesizing unit 108 to synthesize two images into one image. In this embodiment, synthesizing into one image by the two-image synthesizing unit 108 is performed in such a manner that the rotation display images 202 and 203 are disposed on right and left screen areas, respectively.

Next, the video signal synthesized by the two-image synthesizing unit 108 is input to the image processing unit 109 which in turn performs scaling including image magnification, image reduction, geometrical distortion correction and the like and outputs the processed video signal to the driver circuit 112. In accordance with this input signal, the driver circuit 112 controls the liquid crystal panel 114 to display a projected image such as that shown in FIG. 2A.

An input display image is generally a laterally elongated image. Since the liquid crystal display 114 is also laterally elongated, the input image can be displayed largest if the first angle is set to 90 degrees in the clockwise direction and the second angle is set to 270 degrees in the clockwise direction as described above. Since the first rotation display image 202 and second rotation display image 203 are synthesized so as to contact the upper ends thereof, even if a number of viewers view the projected image 201 as shown in FIG. 3, each viewer views either the first rotation display image 202 or second rotation display image 203 which is nearer to the viewer so that a shift between the up-down direction of each viewer and the up-down direction of the rotation display image 202 or 203 is 90 degrees or smaller.

In conventional one-image on a screen, a number of viewers have poor visual recognition having a shift of 90 degrees or larger between the up-down direction of a viewer and the up-down direction of a projected image. This problem is eliminated by two-image rotation display such as shown in FIG. 2A.

Description will be made next on one-image display on a screen to be used for projection upon a generally vertical flat plane such as a screen. A video signal input from the input terminal 110 is analog-digital converted by the input signal processing unit 111, and the converted digital data is input to the first image rotation unit 106. In this case, CPU 102 controls the first image rotation unit 106 to output the input signal without rotation, and controls the two-image synthesizing unit 108 to output only the image from the first image rotation unit 106, without using the video signal input to the second image rotation unit 107. The video signal output from the two-image synthesizing unit 108 is input to the image processing unit 109 which in turn performs scaling including image magnification, image reduction, geometrical distortion correction and the like of one-image display, and outputs the processed video signal to the driver circuit 112. In accordance with this input signal, the driver circuit 112 controls the liquid crystal panel 114 to display a projected image such as shown in FIG. 2B.

A user can select either two-image rotation display illustrated in FIG. 2A or one-image display illustrated in FIG. 2B. This may be realized by sending a display switching control signal from the operation unit 117 to CPU 102 in response to activation of an operation button, or by sending an IR remote signal from a remote controller in response to activation of the remote controller by a user and sending a display switching control signal from the operation unit 117 to CPU 102. Alternatively, an angle sensor or the like may be mounted in the projection type display 101, and if it is judged that the projection type display 101 projects an image upon a generally vertical flat plane such as a table, two-image rotation display illustrated in FIG. 2A is automatically conducted.

The angle sensor may detect and judge image projection upon a generally horizontal flat plane or upon a generally vertical flat plane, by detecting an installation angle of the projection type display 101 or a posture angle of the projection type display 101.

Alternatively the angle sensor may detect and judge image projection upon a generally horizontal flat plane or upon a generally vertical flat plane, by detecting an angle of a projection direction of a light beam emitted from the lens or an angle of the lens.

As described so far, it is possible to provide a projection type display capable of projecting an image allowing any viewer to have good visual recognition, by rotating each image in a projected image.

Second Embodiment

Next, with reference to FIGS. 4A to 4F and FIG. 5, description will be made on another embodiment of a projection type table display of the present invention. The projection type table display of this embodiment is configured as having a block diagram different from that illustrated in FIG. 1, and has a simple structure because image rotation is restricted to 90 degrees. Although elements in the drawings will be described in detail, for an element having an identical reference numeral to that in FIG. 1, duplicate description is omitted.

Figure 4A:
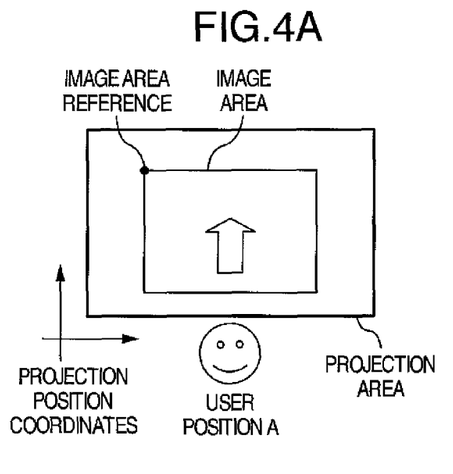
FIGS. 4A to 4F are diagrams illustrating display functions of a projection type table display according to a second embodiment of the present invention.
Figure 4B:
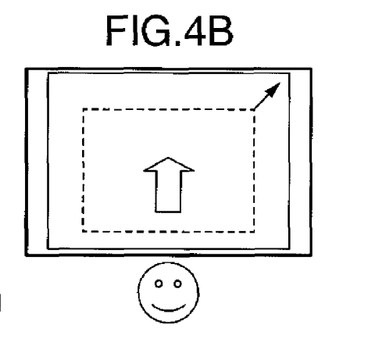

Prior to describing the block structure illustrated in FIG. 5, a projected image display function of the embodiment will be described with reference to FIGS. 4A to 4F. FIG. 4A is a diagram illustrating a fundamental image display of the embodiment. The projection type display of the embodiment is a transmission type liquid crystal projector or the like, and can shift an image and display it in a predetermined area in a projection area of the projection type table display. As illustrated in FIG. 4A, this image area can be set to a predetermined position in the projection area, by designating projection position coordinate values by using the upper left corner of the image area as an image area reference. Image shift display can be performed optically by incorporating known technologies.

In the following description, it is assumed that an image in an image area a user at a user position A in FIG. 4A views is sent as an input image from an upper level apparatus connected to the projection type display.

The display of the embodiment is a transmission type liquid crystal projector or the like, and can perform optical zooming of a projected image by adjusting the projection lens. FIG. 4B illustrates optical zooming. As a video signal of an input image corresponding to the image area in 4A is input, an image optically magnified to the whole projection area is displayed by the zooming function.

Figure 4C:
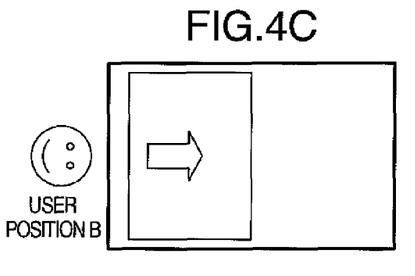
Figure 5:
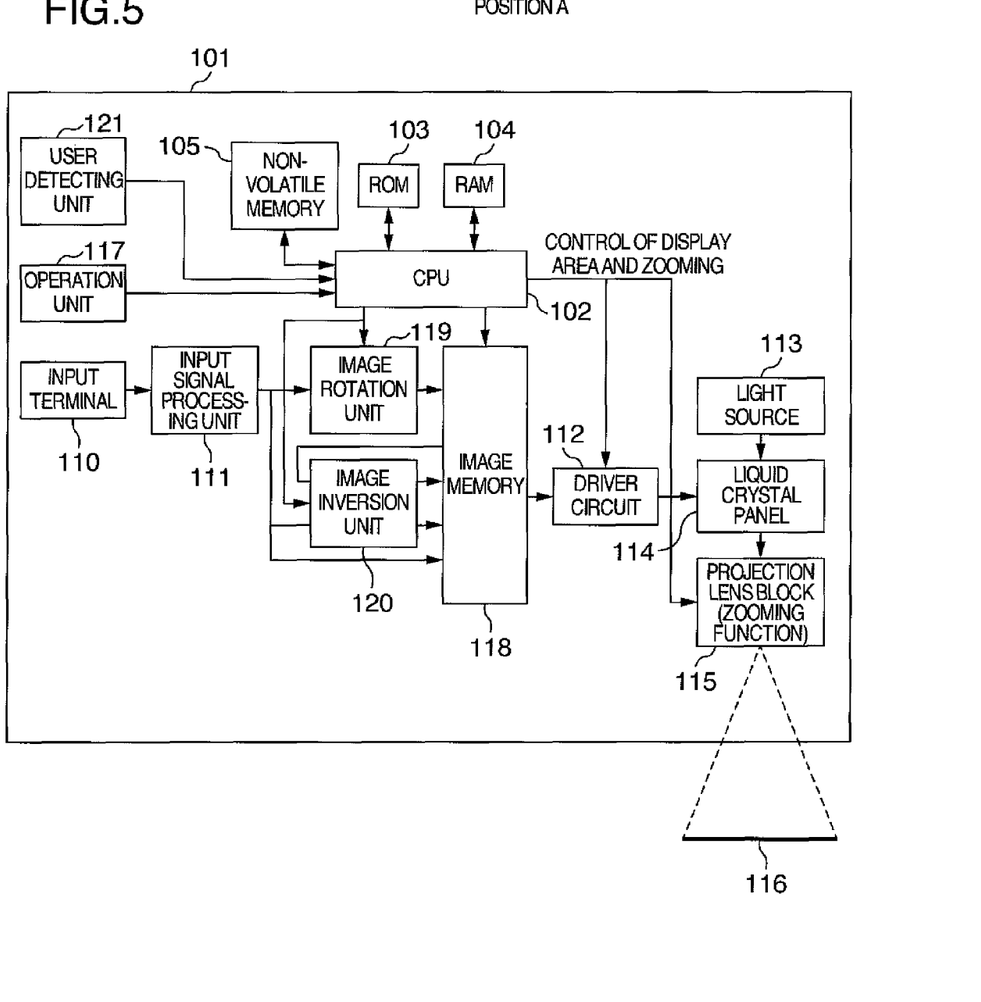
FIG. 5 is a block diagram of the projection type table display of the second embodiment.

The projection type table display of the embodiment is used not only at the user position illustrated in FIGS. 4A and 4B but also at a user position B illustrated in FIG. 4C. In the latter case, the input image is rotated by 90 degrees in the clockwise direction and displayed in the projection area. As described above, the display position is adjusted by setting the projection position coordinates of the image area reference. The positions along the depth direction and right/left direction as viewed from the user at the user position B are adjusted in this manner so that erection image display and magnification image display can be performed.

Figure 4D:
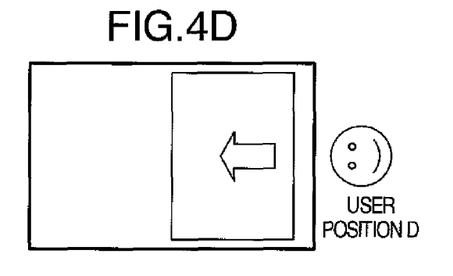

FIG. 4D is a diagram illustrating image display relative to a user at a user position D opposite to the user position B illustrated in FIG. 4C. The projection type table display of the embodiment rotates an input image by 90 degrees in the counter clockwise direction or by 270 degrees in the clockwise direction and displays the rotated image in the projection area so as to allow the user at the user position D to view an erection image. Similar to the example illustrated in FIG. 4C, it is possible to adjust the display position of an image and magnify the image.

Although the details will be described later, in this embodiment, a rotation process of an input image is performed by a combination of a 90-degree rotation process and an inversion process. It is therefore possible to simplify the image rotation unit.

Although not shown, the projection type table display of the embodiment may be used by a user at a position opposite to the user position A illustrated in FIG. 4A. In this case, although an input image may be rotated by 180 degrees in the clockwise direction and displayed in the projection area, in this embodiment this process is realized by performing an inversion process of an input image.

As illustrated in FIGS. 4A, 4C and 4D, the projection type table display of the embodiment performs the rotation process of an input image in accordance with the user position (user positions A, B and D) and displays the rotated image in the image area. In order to realize this, a user position detection unit is provided, and in accordance with a detection result an input image is rotated, the details of which will be described later.

The case wherein a user views an image projected by the projection type table display of the embodiment along one direction has been described above. In the following, description will be made on the case wherein a plurality of users view an image along opposite two directions similar to the first embodiment, with reference to FIG. 4E.

Figure 4E:
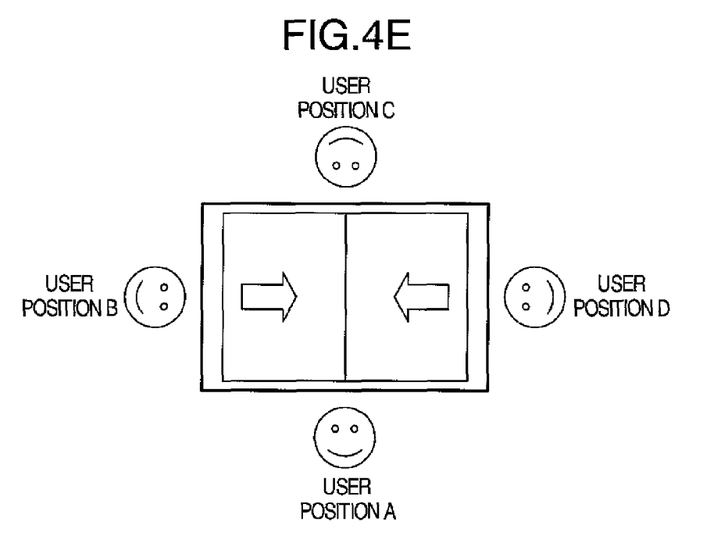

If users are at the user positions B and D along a long side direction of the projection area of the projection type table display of the embodiment, similar to the first embodiment two-image display is performed to provide users with an erection image. For example, in order to allow a user at the user position B to view an erection image, an input image is rotated by 90 degrees in the clockwise direction and displayed in the image area in front of the user position B, whereas in order to allow a user at the user position D to view an erection image, an input image is displayed by performing an inversion process for the image projected in front of the user position B.

By displaying two images of erection display and inversion display along the up/down direction, users at the opposite user positions B and D can view an erection image providing good visual recognition of image information. In this case, even users at the user positions A and C can view image information laterally so that better visual recognition of image information can be provided more than viewing an inversion image.

Users positioned along the long side direction of the projection area have been described with reference to FIG. 4E. Users positioned along the short side direction of the projection area will be described with reference to FIG. 4F. In this case, two images of erection display and inversion display are displayed side by side. With this two-image display, users at the user positions A and C can view an erection image providing good visual recognition of image information. In this case, even users at the user positions B and D can view image information laterally so that better visual recognition of image information can be provided more than viewing an inversion image.

As described above, the user position detection unit detects user positions A, B, C and D of users, to select an image display direction and display two images of erection display and inversion display side by side or along an up-down direction. It is therefore possible to optimize image information in accordance with the user positions of users.

Two-image display is preferably realized along the long side direction of the projection area.

The embodiment will be described in detail with reference to the block diagram illustrated in FIG. 5.

A block having an identical reference numeral to that in FIG. 1 has a similar function, and so duplicate description is omitted.

Description will be made first on the case wherein one erection image is projected as illustrate in FIGS. 4A and 4B. Image information sent from an upper level apparatus is input from an input terminal 110, and subjected to predetermined signal processing by an input signal processing unit 111. In the case of FIGS. 4A and 4B, since image rotation is not performed, the image information is stored in an image memory 118 without involving an image rotation unit 119 and an image inversion unit 120. The image information stored in the image memory 118 is input from a driver circuit 112 to a liquid crystal panel 114 to display a projected image.

In this case, the driver circuit 112 adjusts an image display position by controlling read timings of the image information stored in the image memory 118. Optical zooming of the projected image is performed by controlling a projection lens block 115 to project the image upon the whole projection area, as shown in FIG. 4B.

Description will be made next on rotation display of image information as illustrated in FIG. 4C. As an image along a direction illustrated in FIGS. 4A and 4B is input via the input terminal 110 and input signal processing unit 111, the image rotation unit 119 rotates the image by 90 degrees in the clockwise direction, and the rotated image is stored in the image memory 118. For the image information stored in the image memory 118, the driver circuit 112 adjusts an image display position, and the projection lens block 115 performs optical zooming to project the image.

In the example described above, the image display position and display size are adjusted by the drive circuit 112 and projection lens block 115. Instead, a plurality of image memories 118 and liquid crystal panels 114 corresponding in number to the number of projection areas may be prepared. Image information is stored in the image memory 118 corresponding to the image display position. Image information subjected to a magnification/reduction process may also be stored in the corresponding image memory 118.

FIG. 4D illustrates image information rotated by 270 degrees in the clockwise direction (by 90 degrees in the counter clockwise direction) as described above. The image rotation unit 119 of the embodiment is a unit for performing a rotation process by 90 degrees in the clockwise direction. Therefore, although a rotation unit for rotating by 270 degrees in the clockwise direction (by 90 degrees in the counter clockwise direction) may be provided, a processing scale becomes large. In this embodiment, therefore, a rotation process of rotating by 270 degrees in the clockwise direction (by 90 degrees in the counter clockwise direction) is executed in the following manner.

First, the image information is subjected to a process of rotating by 90 degrees in the clockwise direction by the image rotation unit 119, and the rotated image information is stored in an unused area of the image memory 118. Next, the image information rotated by 90 degrees in the clockwise direction is read to the image inversion process unit 120 which performs an image inversion process and stores the processed image in a predetermined area of the image memory 118. For the image information stored in the image memory, the drive circuit 112 adjusts an image display position, and the projection lens block 115 performs optical zooming to project the image.

The image inversion process can be realized by changing the order of read/write addresses of the image memory 118 or inverting bit trains. Therefore, the image inversion process can be realized by a circuit scale smaller than that for the image rotation process.

In the example illustrated in FIG. 4E, by performing a similar process to that for the image information illustrated in FIG. 4C, image information rotated by 90 degrees in the clockwise direction is stored in a predetermine area of the image memory. Thereafter, the image information in the image memory is read to the image inversion unit 120 which performs the image inversion process and stores the processed image information in a predetermined area of the image memory 118 for two-image display together with the image information rotated by 90 degrees in the clockwise direction, along the up/down direction. For the image information stored in the image memory, the drive circuit 112 adjusts an image display position, and the projection lens block 115 performs optical zooming to project the image.

Figure 4F:
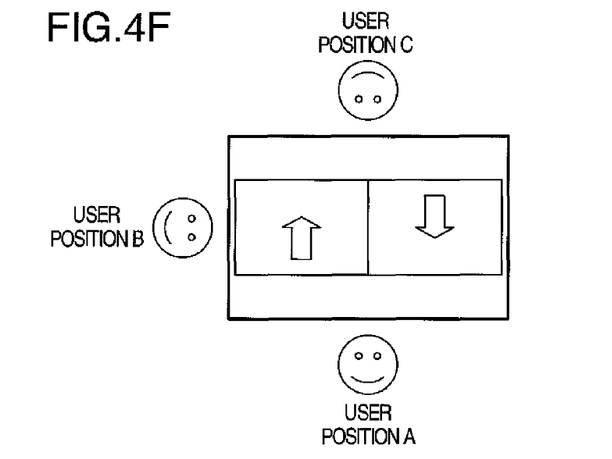

In the example illustrated in FIG. 4F, since image is not rotated as in the example illustrated in FIG. 4A, image information is stored in a predetermined area of the image memory 118 without involving the image rotation unit 119 and image inversion unit 120. The image information not subjected to the rotation process is read to the image inversion unit 120 which performs the image inversion process and writes the inverted image information in a predetermined area of the image memory 118. In this manner, two images of erection display and inversion display are displayed in the projection area side by side along the long side direction.

The user detecting unit 121 detects positions of users with a sensor or the like, and in accordance with a detection result, one of image displays illustrated in FIGS. 4A to 4F is performed. The user detection unit 121 may be the operation unit such as a remote controller for inputting a position of each user.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A projection type display comprising:
   an image processing unit for processing an input image;
   an illumination optical block for radiating an optical beam;
   a liquid crystal panel for modulating the optical beam radiated from said illumination optical block with an output signal from said image processing unit and outputting the modulated optical beam; and
   a projection lens block for projecting the modulated optical beam output from said liquid crystal panel upon a projection object,
   wherein said image processing unit comprises:
   a first image rotation unit for rotating the input image by a first angle;
   a second image rotation unit for rotating the input image by a second angle;
   a two-image synthesizing unit for synthesizing a first output image from said first image rotation unit and a second output image from said second image rotation unit into one image;
   said first image rotation unit or said second image rotation unit executes a scaling process including magnification and reduction of an input image; and
   said first image rotation unit or said second image rotation unit executes a scaling process including magnification, reduction and geometrical distortion correction of an output image from said two-image synthesizing unit.

2. The projection type display according to claim 1, wherein said first angle and said second angle have a difference of 180 degrees.

3. The projection type display according to claim 1, wherein said first angle is 90 degrees in the clockwise direction.

4. A projection type display comprising:
an image processing unit for processing an input image;
an illumination optical block for radiating an optical beam;
a liquid crystal panel for modulating the optical beam radiated from said illumination optical block with an output signal from said image processing unit and outputting the modulated optical beam; and
a projection lens block for projecting the modulated optical beam output from said liquid crystal panel upon a projection object,
wherein said image processing unit comprises:
a first image rotation unit for rotating the input image by a first angle;
a second image rotation unit for rotating the input image by a second angle;
a two-image synthesizing unit for synthesizing a first output image from said first image rotation unit and a second output image from said second image rotation unit into one image; and
said two-image synthesizing unit executes a scaling process including magnification and reduction of a first output image from said first image rotation unit and a second output image from said second image rotation unit, respectively, and thereafter, performs image synthesis.

5. The projection type display according to claim 4, wherein said image processing unit executes a scaling process including magnification, reduction and geometrical distortion correction of an output image from said two-image synthesizing unit.

6. A projection type display comprising:
an image processing unit for processing an input image;
an illumination optical block for radiating an optical beam;
a liquid crystal panel for modulating the optical beam radiated from said illumination optical block with an output signal from said image processing unit and outputting the modulated optical beam;
a projection lens block for projecting the modulated optical beam output from said liquid crystal panel upon a projection object, and
an operation unit for receiving a user operation;
wherein said image processing unit comprises:
a first image rotation unit for rotating the input image by a first angle;
a second image rotation unit for rotating the input image by a second angle; and
a two-image synthesizing unit for synthesizing a first output image from said first image rotation unit and a second output image from said second image rotation unit into one image;
if an optical beam output from said projection lens block is projected upon a generally vertical flat plane of the projection object, one image on a screen is output from said image processing unit; and
in response to a signal from said operation unit, an output image from said image processing unit is switched between an output image of one image on a screen and an output image of two images on a screen.

7. A projection type display comprising:
an image processing unit for processing an input image;
an illumination optical block for radiating an optical beam;
a liquid crystal panel for modulating the optical beam radiated from said illumination optical block with an output signal from said image processing unit and outputting the modulated optical beam;
a projection lens block for projecting the modulated optical beam output from said liquid crystal panel upon a projection object, and
an angle sensor for detecting an installation angle of said projection type display or a posture angle of said projection type display, or for detecting an angle of said projection lens block or an angle of an optical beam output from said projection lens block;
wherein said image processing unit comprises:
a first image rotation unit for rotating the input image by a first angle;
a second image rotation unit for rotating the input image by a second angle; and
a two-image synthesizing unit for synthesizing a first output image from said first image rotation unit and a second output image from said second image rotation unit into one image;
if an optical beam output from said projection lens block is projected upon a generally vertical flat plane of the projection object, one image on a screen is output from said image processing unit; and
in response to a signal from said angle sensor, an output image from said image processing unit is switched between an output image of one image on a screen and an output image of two images on a screen.

8. A projection type display for optically modulating an optical beam from a light source with image information and projecting the modulated optical beam, comprising:
an image rotation unit for executing a 90-degree rotation process for an input image;
an image inversion unit for inverting image information upside down;
an image memory for memorizing processing results by said image rotation unit and by said image inversion unit to store the image information;
a drive circuit for reading the image information from said image memory to control the optical modulation;
a liquid crystal panel for performing the optical modulation of the optical beam;
a projection lens block for magnifying and displaying the modulated optical beam; and
a user position detection unit for detecting a position of a user viewing a display image by the projection type display;
wherein in accordance with a detection result of said user position detection unit, said image rotation unit or said image inversion unit processes the input image to perform two-image display along an up-down direction or two-image display side by side along a right/left direction.

9. The projection type display according to claim 8, wherein if said user position detection unit detects users along a long side direction of a projection area, two-image display along an up-down direction is performed by disposing along the long side direction of the projection area an image obtained by rotating the input image by said image rotation unit and an image obtained by inverting the image rotated by said image rotation unit.

10. The projection type display according to claim 8, wherein if said user position detection unit detects users along a short side direction of a projection area, two-image display side by side along a right/left direction is performed by disposing along the long side direction of the projection area the input image and an image obtained by inverting the input image.

11. A projection type display for optically modulating an optical beam from a light source with image information and projecting the modulated optical beam, comprising:

- an image rotation unit for executing a 90-degree rotation process for an input image;
- an image inversion unit for inverting image information upside down;
- an image memory for memorizing processing results by said image rotation unit and by said image inversion unit to store the image information;
- a drive circuit for reading the image information from said image memory to control the optical modulation;
- a liquid crystal panel for performing the optical modulation of the optical beam;
- a projection lens block for magnifying and displaying the modulated optical beam; and
- a user position detection unit for detecting a position of a user viewing a display image by the projection type display;

wherein in accordance with a detection result of said user position detection unit, said image rotation unit or said image inversion unit processes the input image so as to display an erection image as viewed by a user.

* * * * *